: US 8,462,419 B2
(45) Date of Patent: Jun. 11, 2013

(54) COMPOSITION FOR ELECTROCHROMIC DEVICES AND ELECTROCHROMIC DISPLAY DEVICE USING THE SAME

(75) Inventors: Katsuyoshi Hoshino, Chiba (JP); Yosuke Oikawa, Chiba (JP); Mai Ando, Chiba (JP); Ryota Nakajima, Chiba (JP); Katsuyuki Murashiro, Ichihara (JP); Toshiki Komatsu, Ichihara (JP)

(73) Assignees: National University Corporation Chiba University, JNC Corporation (JP); JNC Corporation, Tokyo (JP)

( * ) Notice: Subject to any disclaimer, the term of this patent is extended or adjusted under 35 U.S.C. 154(b) by 102 days.

(21) Appl. No.: 13/283,242

(22) Filed: Oct. 27, 2011

(65) Prior Publication Data

US 2012/0105933 A1 May 3, 2012

(30) Foreign Application Priority Data

Oct. 29, 2010 (JP) ................................ 2010-244462
Jul. 20, 2011 (JP) ................................ 2011-159339

(51) Int. Cl.
*G02F 1/155* (2006.01)
*G02F 1/361* (2006.01)
*G02F 1/00* (2006.01)

(52) U.S. Cl.
USPC ........... 359/266; 359/265; 359/273; 252/582; 252/583; 252/586

(58) Field of Classification Search
USPC ................ 359/265–275; 252/62.2, 582, 583, 252/586
See application file for complete search history.

(56) References Cited

U.S. PATENT DOCUMENTS 6,828,062 B2 * 12/2004 Lu et al. ......................... 429/213
7,428,091 B2 * 9/2008 Baumann et al. .............. 359/265
7,855,821 B2 * 12/2010 Baumann et al. .............. 359/273

FOREIGN PATENT DOCUMENTS

JP 2009-086259 4/2009

OTHER PUBLICATIONS

Grätzel, "Ultrafast colour displays", Nature, vol. 409, 2001, pp. 575-576.
Bird, et al., "Electrochemistry of the Viologens", Chem.Soc. Rev., vol. 10, 1981, p. 49.

\* cited by examiner

*Primary Examiner* — Loha Ben
(74) *Attorney, Agent, or Firm* — Hamre, Schumann, Mueller & Larson, P.C.

(57) ABSTRACT

There is provided a composition for electrochromic devices which clearly present only two states, a white-colored state and a decolored state. The composition for electrochromic devices contains (A) a specific quaternary ammonium salt, (B) a supporting electrolyte containing bromide ion, and (C) a solvent containing water as an essential component, and (A) is soluble in (C).

7 Claims, 10 Drawing Sheets

COMPOSITION FOR ELECTROCHROMIC DEVICES AND ELECTROCHROMIC DISPLAY DEVICE USING THE SAME

TECHNICAL FIELD

The present invention relates to a composition for electrochromic devices and an electrochromic display device using the same.

BACKGROUND ART

Display devices for displaying results of processing executed by information processors (for example, liquid crystal display devices etc.) are becoming very important with the spread of information processors such as personal computers.

At present electrochromic display devices utilizing so-called electrochromism are proposed as new display devices (refer to, for example, M. Gratzel, Nature, 409 (2001) 575). The electrochromism refers to the reversible color change (a colored state and decolored state) of electrochromic materials, during the electrochemical redox reaction. Electrochromic devices have such advantages as that (1) they show superior visibility, (2) they can provide a large display, (3) they have low viewing angle dependency, and (4) they can display clear images. In these respects they are expected to be applied especially to extremely thin displays such as so-called electronic papers.

Viologen compounds are known as materials used for display devices utilizing the electrochromism (refer to, for example, Japanese Unexamined Patent Application Publication No. 2009-86259 and C. L. Bard, A. T. Kuhn, Chem. Soc. Rev., 10 (1981) 49). Viologen compounds generally show remarkable change in color between a colored state and a decolored state. Therefore viologen is expected to become a key material in developing electrochromic display devices.

However, viologen compounds present purple color in color-developed state, and will not present white-color that is a basic color of display devices. Thus, any electrochromic materials which present a white color state and a decolorized state, have not been obtained so far.

SUMMARY OF THE INVENTION

Object to be Achieved by the Invention

The inventors of the present invention previously developed a method of displaying a white color using a viologen compound such as 1,1'-dibenzyl-4,4'-bipyridinium, and filed a patent application therefor. Unfortunately, it was necessary in this method to once apply a voltage for developing a purple color in advance to displaying a white color. If a voltage is applied so as to change a decolored state (transparent state) into a white-colored state skipping the step of developing a purple color as described, the white color is slightly yellowed.

It is an object of the present invention to provide a composition for electrochromic devices which clearly present only two states, a white colored-state and a decolored state, both states are switched reversibly by change of voltage in one step.

Means for Achieving the Object

The inventors conducted various studies in order to achieve the aforementioned object. As a result, they found that a composition containing (A) a quaternary ammonium salt or a quaternary phosphonium salt having a specific structure, (B) a supporting electrolyte containing bromide ions, and (C) a solvent containing water as an essential component present only two states of a white-colored state and a decolored state in accordance with the change of applied voltage, thereby accomplished the present invention.

The present invention includes the following aspects.

[1] A composition for electrochromic devices, which contains (A) a quaternary ammonium salt represented by the following formula (1) or a quaternary phosphonium salt represented by the following formula (2), (B) a supporting electrolyte containing bromide ions, and (C) a solvent containing water as an essential component, and wherein (A) the quaternary ammonium salt or the quaternary phosphonium salt is soluble in (C) the solvent containing water as an essential component.

[Formula 1]

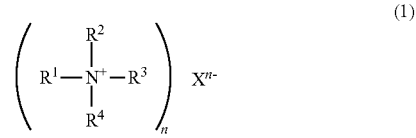

$(n = 1, 2, 3, 4)$

[Formula 2]

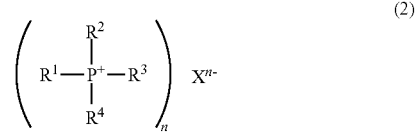

$(n = 1, 2, 3, 4)$

In the formula (1) or (2), $R^1$, $R^2$, $R^3$ and $R^4$ independently represents an unsubstituted or substituted alkyl group having four or more carbon atoms, or an unsubstituted or substituted phenyl group, when the alkyl group or the phenyl group has a substituent, the substituent is halogen or hydroxyl group, and $X^{n-}$ represents an anion selected from halogen ions, hydroxide ion, nitrate ion, sulfate ion, perchlorate ion, tetrafluoroborate ion, phosphate ion, hexafluorophosphate ion, carbonate ion, acetate ion, hydrogencarbonate ion, dihydrogenphosphate ion, hydrogensulfate ion, cyanide ion, thiocyanate ion, sulfite ion, nitrite ion, chlorite ion, hexacyanoferrate(II) ion, and hexacyanoferrate(III) ion.

[2] The composition according to [1] as mentioned above, wherein $R^1$, $R^2$, $R^3$ and $R^4$ in the formulas (1) and (2) represent the same group.

[3] The composition for according to [1] as mentioned above, wherein $X^{n-}$ in the formulas (1) and (2) is halogen ions.

[4] The composition according to [3] as mentioned above, wherein $X^{n-}$ in the formulas (1) and (2) is bromide ion or chloride ion.

[5] The composition for electrochromic devices according to [1] as mentioned above, which further contains a colorant component.

[6] The composition for electrochromic devices according to [5] as mentioned above, wherein the colorant component is carbon black.

[7] An electrochromic display device comprising a) a transparent substrate on which surface a transparent electrode is formed, b) a substrate on which surface an electrode is formed, and c) an electrochromic composition, wherein a) and b) are so disposed that the surfaces thereof having the electrodes face each other, c) is placed between the pair of the substrates a) and b), and c) is the composition according to any one of [1] to [6] as mentioned above.

[8] A method for using a composition for electrochromic devices, wherein the composition contains (A) a quaternary ammonium salt represented by the formula (1) or a quaternary phosphonium salt represented by the formula (2), (B) a supporting electrolyte containing bromide ions, and (C) water.

Effect of the Invention

The composition for electrochromic devices of the present invention presents definite two states, i.e. a white-colored state and a decolored state in accordance, with change of applied voltage. If a colorant component is further added to the composition, the composition present definite two states, i.e. a white-colored state and a colored state having the color of the colorant.

The composition for electrochromic devices of the present invention is useful for display devices, and the electrochromic display device of the present invention is useful for flat panel displays such as electronic papers.

MODES FOR CARRYING OUT THE INVENTION

Figure 1:
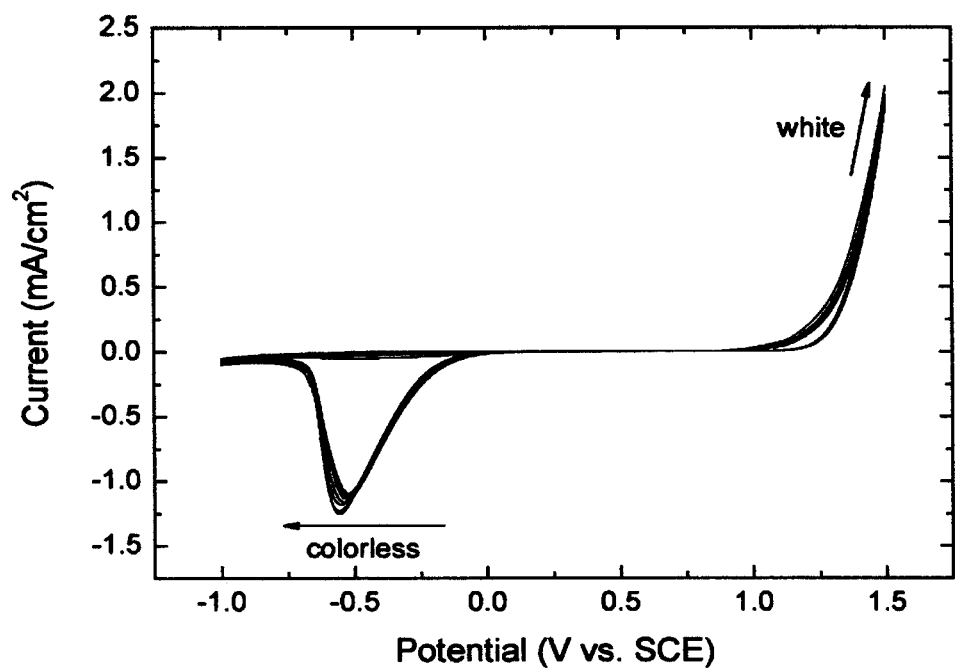
FIG. 1 shows a cyclic voltammogram of the composition prepared in Example 1 under the condition (1) of Example 1.

The composition of the present invention contains (A) a quaternary ammonium salt represented by the following formula (1) or a quaternary phosphonium salt represented by the following formula (2) (hereinafter may simply be referred to as "Salt (A)"), (B) a supporting electrolyte containing bromide ions (hereinafter may simply be referred to as "Supporting electrolyte (B)"), and (C) a solvent containing water as an essential component(hereinafter may simply be referred to as "Water-containing solvent (C)").

[Formula 3]

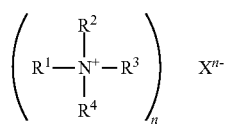

(1)

(n = 1, 2, 3, 4)

[Formula 4]

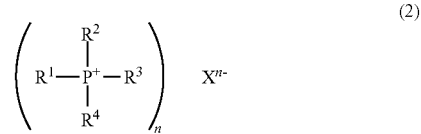

(n = 1, 2, 3, 4)

If bromide ions (Br$^-$) are electrochemically oxidized in Water-containing solvent (C), Br$_2$ generated by the oxidation and Br$^-$ reacts with Br$^-$ near the electrode to generate tribromine ion (Br$_3^-$). Then, Salt (A) binds with Br$_3^-$ to form a white substance, which is deposited on the electrode. Further, if the electrode potential is changed to a potential at which Br$_3^-$ returns to Br$^-$, the white substance returns to the original quaternary ammonium ion or quaternary phosphonium ion and Br$^-$, and colorless and transparent state is presented. These whitening and clearing phenomena occur reversibly.

It has not conventionally known yet that the above quaternary ammonium ion or quaternary phosphonium ion in combination with bromine ion show such a unique electrochromic phenomenon.

In order to realize the above phenomenon, Salt (A) needs to be soluble in Water-containing solvent (C). The term "soluble" means that solubility of Salt (A) is 1 mmol/L or higher. The solubility of Salt (A) is preferably 5 mmol/L or higher, more preferably 7 mmol/L or higher.

$R^1$, $R^2$, $R^3$ and $R^1$ in the formula (1) or (2) independently represent an unsubstituted or substituted alkyl group having four or more carbon atoms, or an unsubstituted or substituted phenyl group. When the alkyl group or the phenyl group has a substituent, the substituent is halogen or hydroxyl group. If any one of $R^1$, $R^2$, $R^3$ or $R^4$ an alkyl group contains three or less carbon atoms, it becomes difficult for the quaternary ammonium salt or the quaternary phosphonium salt to bind with Br$_3^-$, and a white substance is not easily generated. Therefore, the composition cannot clearly present a white color in an electrochromic device. On the other hand, as the number of carbon atoms involved in the alkyl group increases, the quaternary ammonium salt or the quaternary phosphonium salt tends to become hard to be dissolved in Water-containing solvent (C). Therefore, the number of carbon atoms involved in the alkyl group is preferably 18 or less, more preferably 12 or less, still more preferably 8 or less, most preferably 6 or less. The preferred range of the carbon number of the alkyl group also changes depending on the non-aqueous components such as alcohol in Water-containing solvent (C). When Water-containing solvent (C) is water, the preferred range of the carbon number of the alkyl group is 4 to 6. When Water-containing solvent (C) is a binary mixed solvent of water and methanol at a volume ratio of 1:0.5 to 1:2, the preferred range of the carbon number of the alkyl group is 4 to 8.

The alkyl group may be linear or branched. It is preferred that $R^1$, $R^2$, $R^3$ and $R^4$ are alkyl groups of the same carbon numbers, and it is particularly preferred that $R^1$, $R^2$, $R^3$ and $R^4$ are the same linear alkyl groups, since such a quaternary ammonium salt or quaternary phosphonium salt having the same linear alkyl groups as $R^1$, $R^2$, $R^3$ and $R^4$ can be easily synthesized and obtained at a low cost. So long as $R^1$, $R^2$, $R^3$ and $R^4$ satisfy the requirement of the above, $R^1$, $R^2$, $R^3$ and $R^4$ may include both the alkyl group and the phenyl group. However, in view of ease of synthesis or availability, those having the same alkyl groups or the same phenyl groups are most preferred.

$X^{n-}$ in the formula (1) or (2) represents a counter ion, and examples thereof include halogen ions, hydroxide ion, nitrate ion, sulfate ion, perchlorate ion, tetrafluoroborate ion, phosphate ion, hexafluorophosphate ion, carbonate ion, acetate ion, hydrogencarbonate ion, dihydrogenphosphate ion, hydrogensulfate ion, cyanide ion, thiocyanate ion, sulfite ion, nitrite ion, chlorite ion, hexacyanoferrate(II) ion, and hexacyanoferrate(III) ion. Among these, a halogen ion, especially bromide ion or chloride ion, is preferred in view of availability of the corresponding quaternary ammonium salt or quaternary phosphonium salt.

Examples of the quaternary ammonium salt satisfying the above requirements include a tetraalkylammonium halide having C4 to C6 alkyl group, a tetraalkylammonium hydroxide having C4 to C6 alkyl group, a tetraphenylammonium halide and a tetraphenylammonium hydroxide.

Examples of the above tetraalkylammonium halides include a tetrabutylammonium halide such as tetrabutylammonium bromide, tetrabutylammonium chloride and tetrabutylammonium fluoride; a tetrapentylammonium halide such as tetrapentylammonium bromide, tetrapentylammonium chloride and tetrapentylammonium fluoride; and a tetrahexylammonium halide such as tetrahexylammonium bromide, tetrahexylammonium chloride and tetrahexylammonium fluoride.

Further, examples of the quaternary ammonium salt satisfying the aforementioned requirements include a tetraalkylammonium halide having C7 alkyl group such as tetraheptylammonium bromide, tetraheptylammonium chloride and tetraheptylammonium fluoride; and a tetraalkylammonium halide having C8 alkyl group such as tetraoctylammonium bromide, tetraoctylammonium chloride and tetraoctylammonium fluoride.

Examples of the aforementioned tetraalkylammonium hydroxide include those having C4 to C8 alkyl group such as tetrabutylammonium hydroxide, tetrapentylammonium hydroxide, tetrahexylammonium hydroxide; and tetraheptylammonium hydroxide and tetraoctylammonium hydroxide.

Examples of the aforementioned tetraphenylammonium halide include tetraphenylammonium bromide, tetraphenylammonium chloride, tetraphenylammonium fluoride, and so forth.

Other than the quaternary ammonium salts mentioned above, quaternary ammonium salts soluble in Water-containing solvent(c) can also be used. Examples include those salts such as 1,2,3-tributyl-4-decylammonium, tributyl-4-dodecylammonium, and so forth.

Examples of the quaternary phosphonium salt include those quaternary phosphonium salts which correspond to the quaternary ammonium salts as mentioned above. For example, there can be exemplified tetraalkylphosphonium halides having C4 to C6 alkyl group, tetraalkylphosphonium hydroxides having C4 to C8 alkyl group; tetraphenylphosphonium halides and tetraphenylphosphonium hydroxides.

Examples of the aforementioned tetraalkylphosphonium halide include a tetrabutylphosphonium halide such as tetrabutylphosphonium bromide, tetrabutylphosphonium chloride and tetrabutylphosphonium fluoride; a tetrapentylphosphonium halide such as tetrapentylphosphonium bromide, tetrapentylphosphonium chloride and tetrapentylphosphonium fluoride; and a tetrahexylphosphonium halide such as tetrahexylphosphonium bromide, tetrahexylphosphonium chloride and tetrahexylphosphonium fluoride.

Concentration of Salt (A) in the composition for electrochromic devices is preferably 1 to 5000 mmol/L, more preferably 5 to 2000 mmol/L, most preferably 5 to 1000 mmol/L.

If the concentration of Salt (A) in the composition is not lower than the lower limit of the aforementioned range, distinct white-colored state is obtained. Further, if Salt (A) in the composition is not higher than the upper limit of the aforementioned range, the deposited Salt (A) on the electrode dissolves in a short time by its electroreduction, thereby an electrochromic display device having an enhanced switching speed with distinct white-colored state is obtainable by using the composition.

The kind of Supporting electrolyte (B) is not particularly limited so long as the electrolyte can impart electrical conductivity to Water-containing solvent (C) when voltage is applied, thereby tribromine ions ($Br_3^-$) is generated. Examples of Supporting electrolyte (B) include LiBr, NaBr, KBr, CsBr, $(CH_3)_4NBr$, $(C_2H_5)_4NBr$, $(C_3H_7)_4NBr$, $(C_4H_9)_4NBr$, $(C_5H_{11})_4NBr$, $(C_6H_{13})_4NBr$, and so forth. Among these, tetraalkylammonium bromide or tetraalkylphosphonium bromide functions both as Salt (A) and as Supporting electrolyte (B). Therefore, it is noted that a composition comprising a tetraalkylammonium bromide or a tetraalkylphosphonium bromide and a Water-containing solvent (C) falls within the scope of the present invention.

Concentration of Supporting electrolyte (B) is not particularly limited, so long as electrical conductivity can be imparted to Water-containing solvent (C). In order to suppress the rise of the viscosity of the composition, the concentration of Supporting electrolyte (B) in the composition for electrochromic devices is preferably 0.01 to 1 mol/L, more preferably 0.05 to 0.5 mol/L, most preferably 0.1 to 0.5 mol/L.

Molar ratio of Salt (A) to Supporting electrolyte (B) (Salt (A):Supporting electrolyte (B)) is preferably in the range of 1:10 to 1:1,000, more preferably 1:20 to 1:200.

When Salt (A) is a tetraalkylammonium bromide, the molar ratio of tetraalkylammonium bromide to Supporting electrolyte (B) is preferably in the range of 1:0 to 1:1,000, more preferably in the range of 1:0 to 1:200.

When Salt (A) is a tetraalkylphosphonium bromide, the molar ratio of tetraalkylphosphonium bromide to Supporting electrolyte (B) is preferably in the range of 1:0 to 1:1,000, more preferably in the range of 1:0 to 1:200.

Total concentration of Salt (A) and Supporting electrolyte (B) in the composition is preferably 0.01 to 5 mol/L, more preferably 0.05 to 1 mol/L, most preferably 0.1 to 0.5 mol/L.

Water-containing solvent (C) used in the composition of the present invention is a solvent which contains water as an essential component. Water-containing solvent (C) may include some non-aqueous constituent so long as such constituent does not markedly impair the electrical conductivity of Water-containing solvent (C) and does not markedly reduce the solubility of Salt (A) in Water-containing solvent (C). Examples of the non-aqueous constituents include for example, methanol and ethanol. When a mixture of a non-aqueous constituent and water is used, mixing ratio in volume of the non-aqueous constituent and water(the non-aqueous constituent : water) is preferably 1:0.01 to 1:100, more preferably 1:0.01 to 1:10, most preferably 1:0.01 to 1:1.

The composition for electrochromic devices of the present invention preferably contains a colorant component. The white substance consisting of the quaternary ammonium ion or quaternary phosphonium ion and $Br_3^-$ is returned to the original quaternary ammonium salt or quaternary phosphonium salt and $Br^-$ by an electrochemical reduction, and dissolved in the solvent, thus the white color on the surface of electrode disappears, and the electrode becomes colorless and transparent. As a result, when the composition contains a colorant component, a colorized solution as the background can be recognized through the electrode which has become transparent.

The kind of the colorant component is not particularly limited, and existing pigments or dyes may be used independently or as a combination thereof. Hue of the colorant component is not particularly limited, and such colorant components as black color components, red color components and blue color components can be preferably used. As the black color components, black pigments such as carbon black, and black dyes such as C.I. Acid Black 2 and Direct Black 22 can be used. In view of coloring effect, carbon black is preferred. As the red color components, red pigments such as C.I. Pigment Reds 1, 2 and 3, and red dyes such as C.I. Solvent Reds 1, 3 and 8 can be preferably used. As the blue color components, blue pigments such as C.I. Pigment Blues 2, 3 and 15, and blue dyes such as C.I. Direct Blues 1 and 2 can be preferably used. When a color pigment which is hardly dispersable in water is used, surfaces of the pigment may be subjected to a hydrophilization treatment to such an extent that the electrochemical reaction of bromide ions is not inhibited, or a dispersing agent may be added to the composition to such an extent that display quality is not degraded.

The aforementioned colorant component is preferably included in the composition for electrochromic devices at a concentration of 0.01 to 10% by weight, More preferably 0.01 to 5% by weight, most preferably 0.01 to 1% by weight.

Moreover, other components may also be included in the composition in order to improve display quality, or to enhance response speed (switching speed), and so forth.

By using the characteristics of the composition of the present invention, there can be obtained an electrochromic display device having such a structure that a) a transparent substrate on which surface a transparent electrode is formed and a substrate on which surface an electrode is formed constitute a pair of substrates, b) each of the substrates so disposes that the surfaces thereof having the electrodes face each other, and c) the composition of the present invention is placed between the pair of the substrates. In the device as described above, the quaternary ammonium in the composition of the present invention is repeatedly deposited and dissolved on the electrode according to predetermined voltage change.

EXAMPLES

Purified water: Purified water as prepared below was used as a solvent component in the following Example or Comparative Example. Water was distilled by using a distillation apparatus "STILL-N1P" (IWAKI Co., Ltd) and was purified further by using a cartridge type pure-water production system "Model G-10C"(ORGANO CORP). Obtained sample of purified water has an electrical conductivity of 18 MΩ/cm.

Example 1

Figure 2:
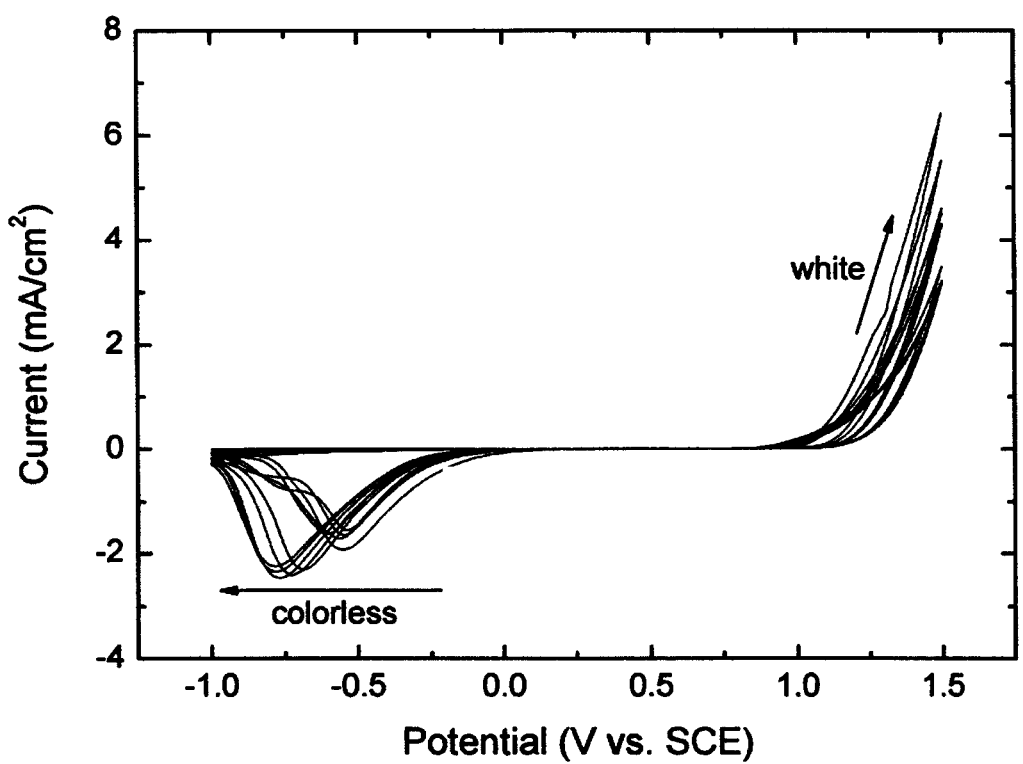
FIG. 2 shows a cyclic voltammogram of the composition prepared in Example 1 under the condition (2) of Example 1.
Figure 3:
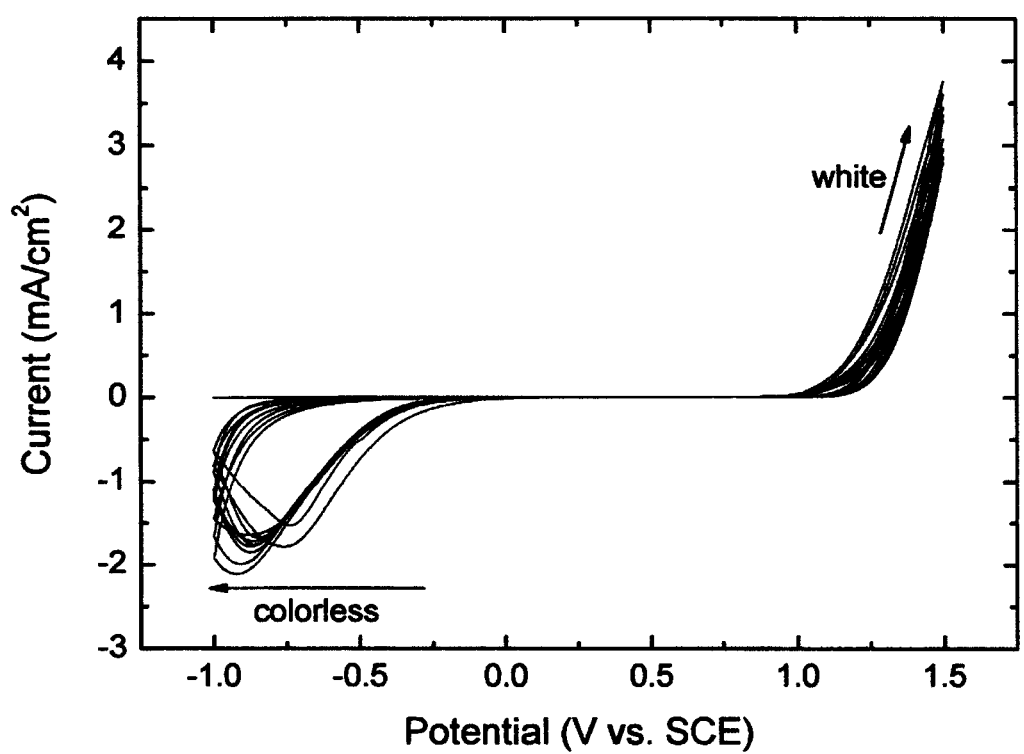
FIG. 3 shows a cyclic voltammogram of the composition prepared in Example 1 under the condition (3) of Example 1.

Tetrabutylammonium bromide was used as the quaternary ammonium salt, and the purified water was used as the solvent. Solutions were prepared by adding LiBr as the supporting electrolyte at a concentration of 0.1 mol/L to the aqueous solutions of tetrabutylammonium bromide having concentrations of (1) 7 mmol/L, (2) 14 mmol/L and (3) 21 mmol/L. Cyclic voltammetry was performed on the solution having concentration of (1) to (3) of the above by using an ITO electrode as a working electrode, a Pt plate as a counter electrode, and a saturated calomel electrode (SCE) as a reference electrode. Before applying a voltage, nitrogen was bubbled in the aforementioned solutions for 30 minutes, and then the inside of the cell was maintained under nitrogen atmosphere. Potential sweep was performed 10 times within a potential range of −1.0 V to +1.5 V and a sweep rate of 20 mV/s. In the experiments on the solutions having concentration of (1) to (3) above, immersion areas of the working electrode were (1) 0.58 cm$^2$, (2) 0.40 cm$^2$, and (3) 0.51 cm$^2$, respectively. The cyclic voltammograms obtained under the respective conditions are shown in FIGS. 1 to 3. In the experiment under the condition (1), there was observed deposition of a white substance as a layer on the ITO electrode at about 1.4 V. When the sweep was further continued, the layer of the white substance on the electrode completely disappeared at about −0.5 V. This phenomenon was repeatedly confirmed, even when the number of repetition of the sweeps was increased. In the experiments under the condition of (2) or (3), deposition and disappearance of a white substance were similarly confirmed, although there was observed a tendency that the voltage at which the layer of the white substance disappeared slightly lowered compared with the voltage observed under the condition (1).

Example 2

Figure 4:
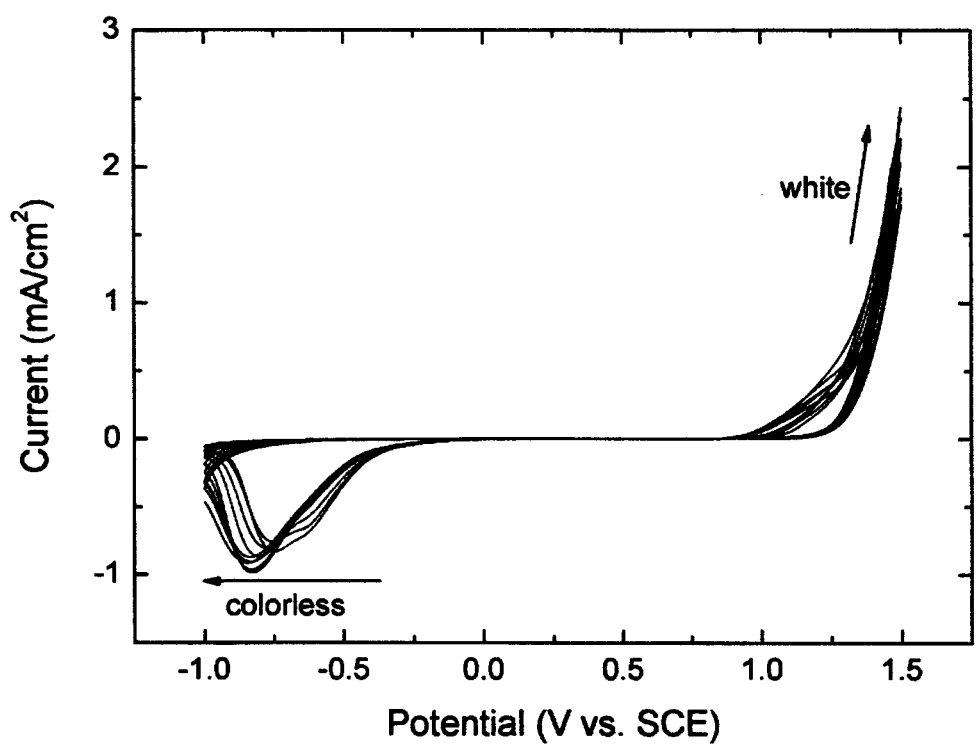
FIG. 4 shows a cyclic voltammogram of the composition prepared in Example 2.

An experiment was performed in the same manner as that of Example 1 using the condition (1) except that tetrapentylammonium bromide was used as the quaternary ammonium salt, and the immersion area of the working electrode was 0.71 cm$^2$. The cyclic voltammogram obtained in this experiment is shown in FIG. 4.

Comparative Example 1

Figure 5:
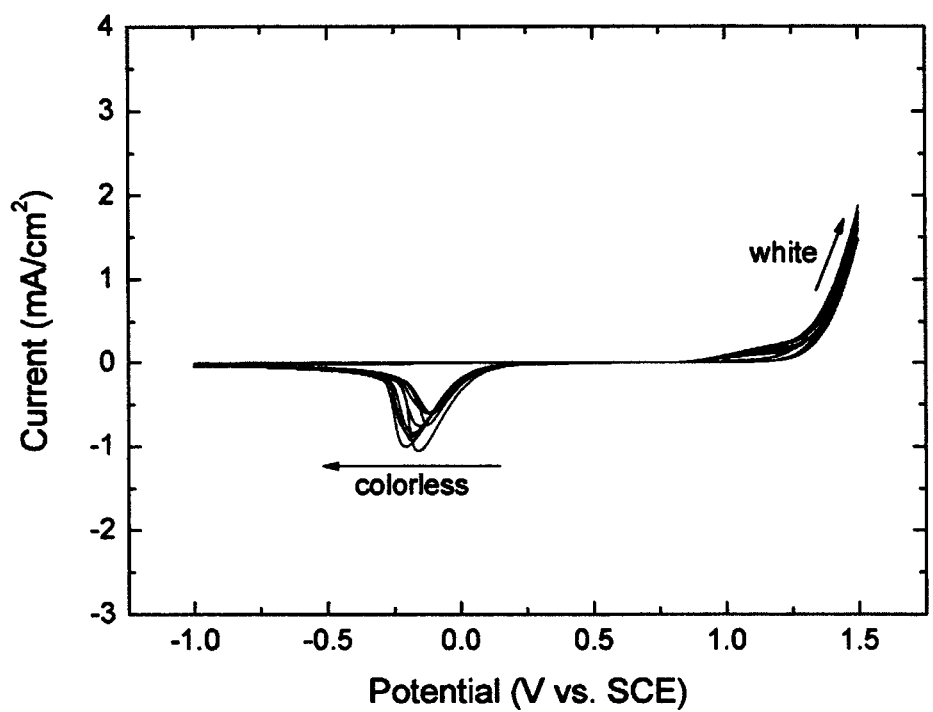
FIG. 5 shows a cyclic voltammogram of the composition prepared in Comparative Example 1

An experiment was performed in the same manner as that of Example 1 using the condition (1) except that tetrapropylammonium bromide was used as the quaternary ammonium salt, and the immersion area of the working electrode was 0.49 cm$^2$. The cyclic voltammogram obtained in this experiment is shown in FIG. 5. There was observed deposition of a white substance as a layer on the ITO electrode at about 1.4 V. However, the layer of the white substance was extremely thin and thus unsuited to practical use. When the sweep was further continued to −0.25 V, the layer of the white substance disappeared.

Comparative Example 2

It was attempted to dissolve tetraheptylammonium bromide as the quaternary ammonium salt in water at a concentration of 7 mmol/L, but the salt was not dissolved. Even after the water was heated, the quaternary ammonium salt remained floating on the surface of the water, and could not be dissolved.

Example 3

Figure 6:
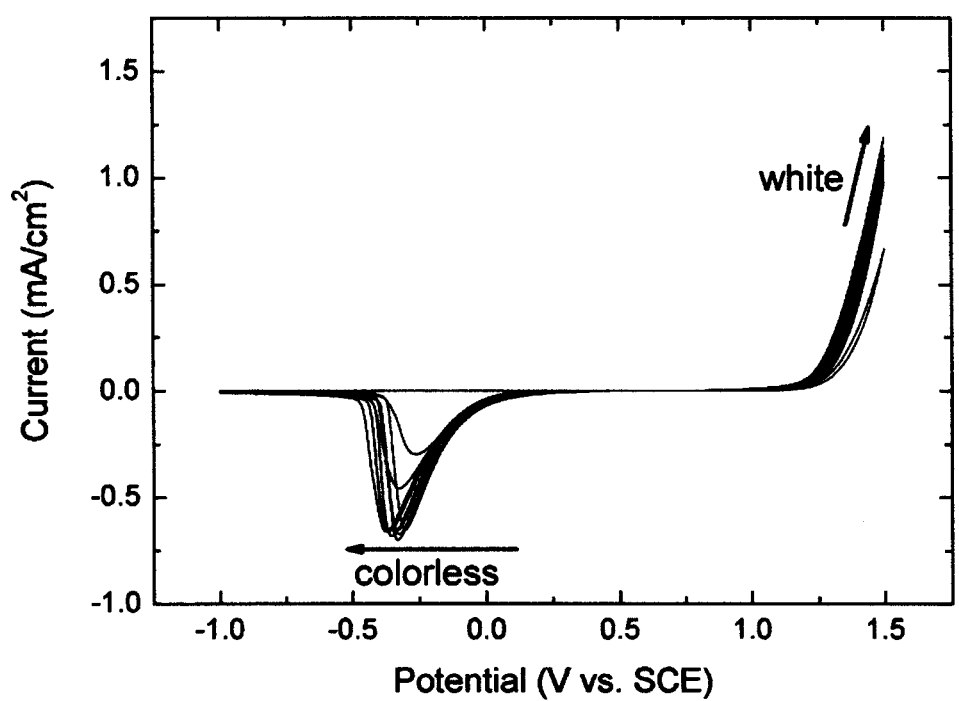
FIG. 6 shows a cyclic voltammogram of the composition prepared in Example 3 under the condition (1) of Example 3.
Figure 7:
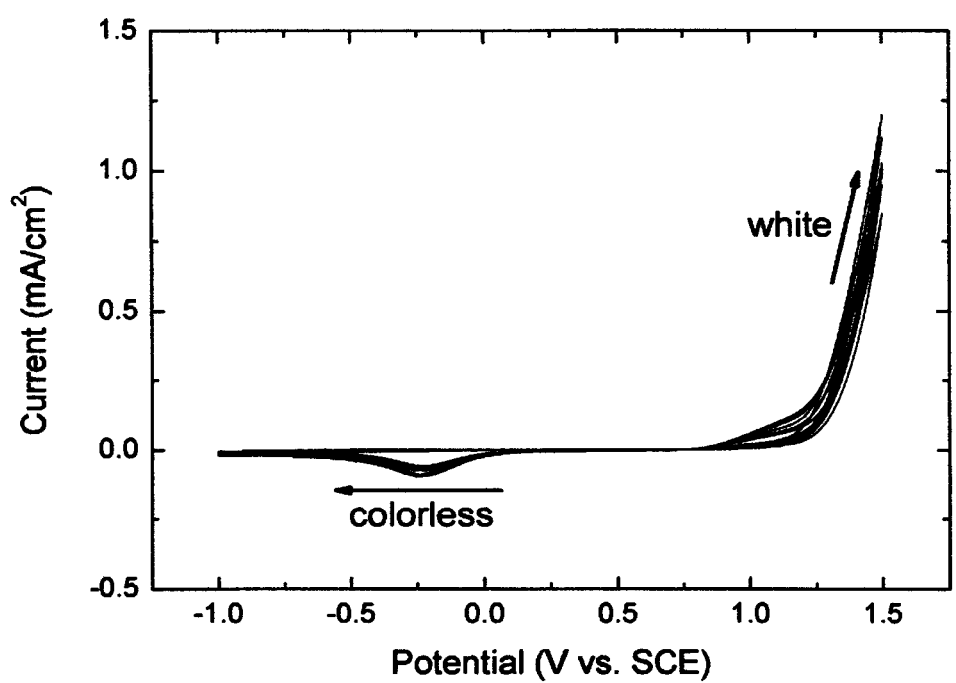
FIG. 7 shows a cyclic voltammogram of the composition prepared in Example 3 under the condition (2) of Example 3.

Experiments were performed in the same manner as that of Example 1 using the condition (1) except that solvents obtained by mixing purified water and ethyl alcohol at volume ratios of (1) 2:1 and (2) 1:1 were used, and the immersion areas of the working electrode were (1) 0.43 cm$^2$ and (2) 0.57 cm$^2$, respectively. The cyclic voltammograms obtained with the respective conditions are shown in FIGS. 6 and 7. In the experiment using the condition (1), there was observed deposition of a white substance as a layer on the ITO electrode at about 1.4 V. When the sweep was further continued, the layer of the white substance on the electrode completely disappeared at about −0.5 V. This phenomenon was repeatedly confirmed, even when the number of repetition of the sweeps was increased. In the experiments using the condition of (2), deposition and disappearance of a white substance was similarly confirmed, although there was observed a tendency that the voltage at which the layer of the white substance disappeared slightly lowered compared with the voltage observed under the condition (1).

Example 4

Figure 8:
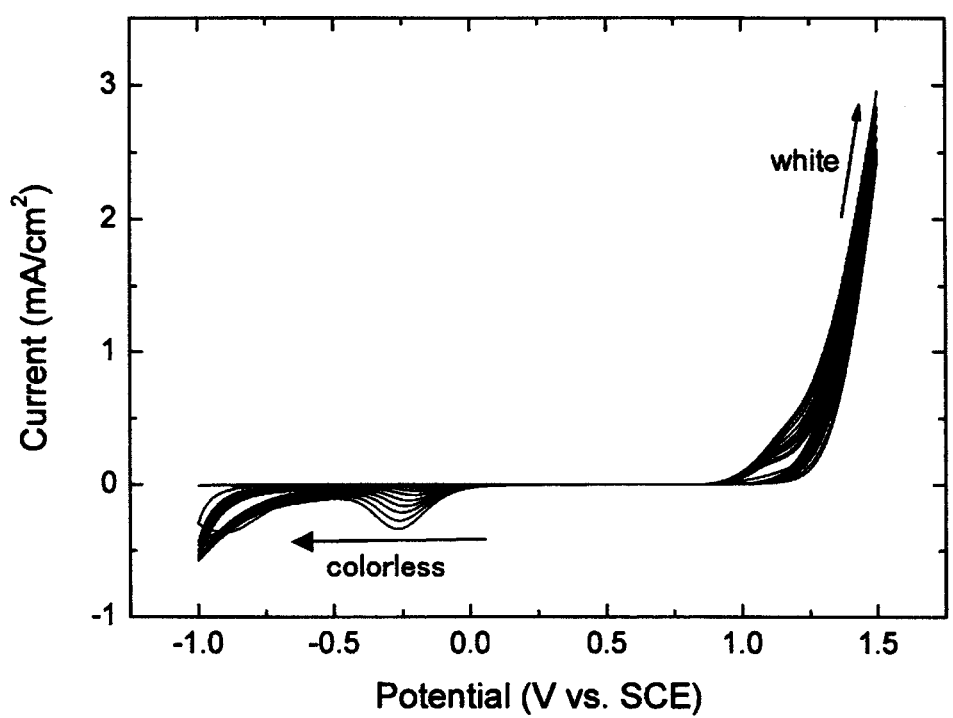
FIG. 8 shows a cyclic voltammogram of the composition prepared in Example 4.

An experiment was performed in the same manner as that of Example 1 using the condition (1) except that tetrahexylammonium bromide was used as the quaternary ammonium salt, and the immersion area of the working electrode was 0.69 cm². The cyclic voltammogram obtained in this experiment is shown in FIG. 8. Deposition and disappearance of a layer of a white substance was confirmed as in Example 1.

Example 5

Figure 9:
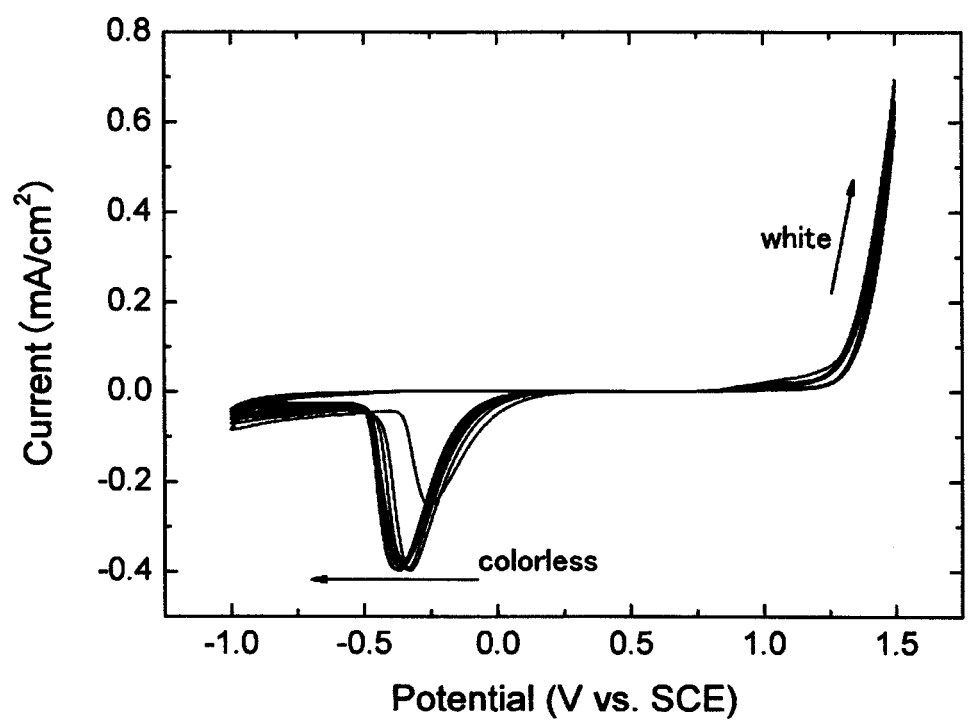
FIG. 9 shows a cyclic voltammogram of the composition prepared in Example 5.

By using tetrabutylammonium bromide as the quaternary ammonium salt and the supporting electrolyte, and purified water as the solvent, a tetrabutylammonium bromide aqueous solution was prepared at a concentration of 0.1 mol/L. In this example, tetrabutylammonium bromide functioned both as the quaternary ammonium salt and as the supporting electrolyte. The immersion area of the working electrode was 0.58 cm². An experiment was performed in the same manner as that of Example 1 using the condition (1) except for the conditions described above. The cyclic voltammogram obtained in this experiment is shown in FIG. 9. Deposition and disappearance of a layer of a white substance was confirmed as in Example 1.

Example 6

Figure 10:
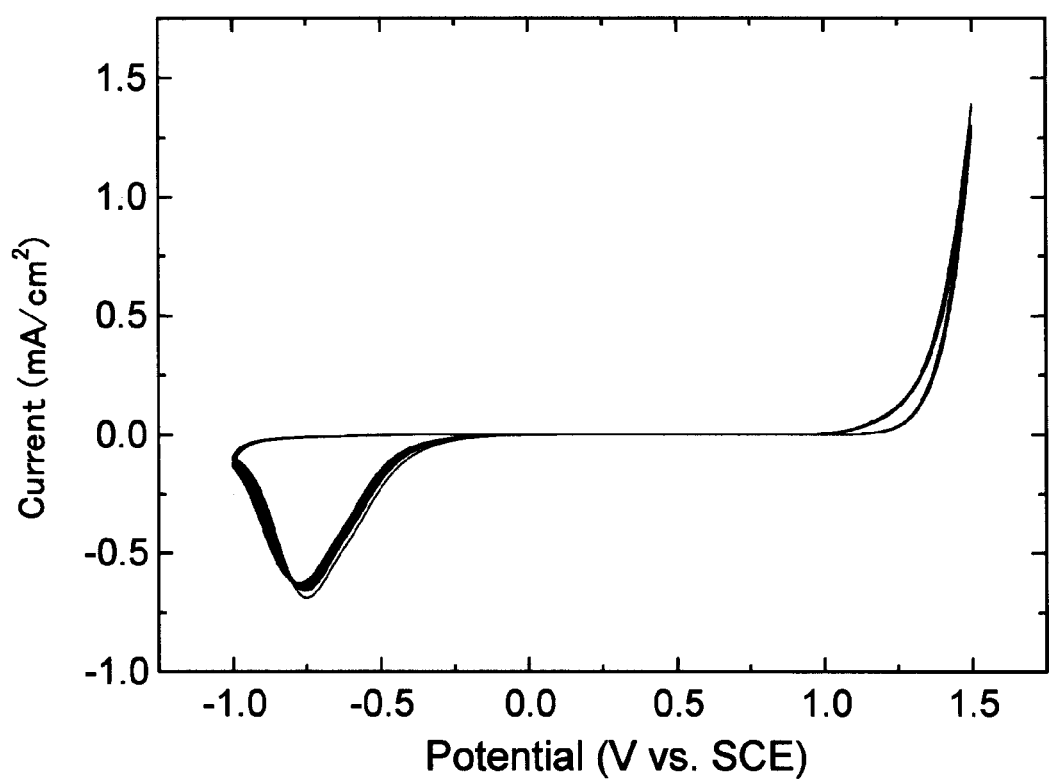
FIG. 10 shows a cyclic voltammogram of the composition prepared in Example 6.

By using tetrabutylphosphonium bromide as the quaternary phosphonium salt, and purified water as the solvent, a tetrabutylphosphonium bromide aqueous solution at a concentration of 0.1 mol/L containing LiBr as the electrolyte at a concentration of 0.5 mol/L was prepared. The immersion area of the working electrode was 0.60 cm². An experiment was performed in the same manner as that of Example 1 using the condition (1) except for the conditions described above. The cyclic voltammogram obtained in this experiment is shown in FIG. 10. Deposition and disappearance of a layer of a white substance was confirmed as in Example 1.

The invention claimed is:

1. A composition for electrochromic devices, which comprises (A) a quaternary ammonium salt represented by the following formula (1) or a quaternary phosphonium salt represented by the following formula (2), (B) a supporting electrolyte containing bromide ions, and (C) a solvent containing water as an essential component, wherein (A) is soluble in (C), wherein

[Formula 1]

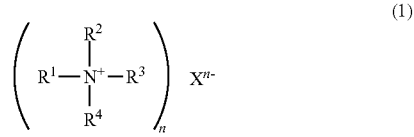

(n = 1, 2, 3, 4)

[Formula 2]

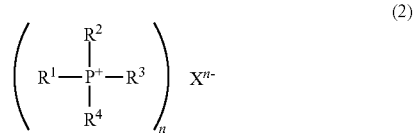

(n = 1, 2, 3, 4)

and wherein, in the formula (1) or (2), $R^1$, $R^2$, $R^3$ and $R^4$ independently represent an unsubstituted or substituted alkyl group having four or more carbon atoms, or an unsubstituted or substituted phenyl group, when the alkyl group or the phenyl group has a substituent, the substituent is halogen or hydroxyl group, and $X^{n-}$ represents an anion selected from halogen ions, hydroxide ion, nitrate ion, sulfate ion, perchlorate ion, tetrafluoroborate ion, phosphate ion, hexafluorophosphate ion, carbonate ion, acetate ion, hydrogencarbonate ion, dihydrogenphosphate ion, hydrogensulfate ion, cyanide ion, thiocyanate ion, sulfite ion, nitrite ion, chlorite ion, hexacyanoferrate(II) ion, and hexacyanoferrate(III) ion.

2. The composition according to claim 1, wherein each of $R^1$, $R^2$, $R^3$ and $R^4$ in the formulas (1) and (2) represent the same group.

3. The composition according to claim 1, wherein $X^{n-}$ in the formulas (1) and (2) is halogen ions.

4. The composition according to claim 3, wherein $X^{n-}$ in the formulas (1 ) and (2) is bromide ion or chloride ion.

5. The composition according to claim 1, which further contains a colorant component.

6. The composition according to claim 5, wherein the colorant component is carbon black.

7. An electrochromic display device, comprising:
  a) a transparent substrate on which surface a transparent electrode is formed;
  b) a substrate on which surface an electrode is formed; and
  c) an electrochromic composition;
  wherein a) and b) are disposed so that the surfaces thereof which have the electrodes face each other; c)is placed between the pair of the substrates a) and b); and c) is the composition according to claim 1.

* * * * *